US006616802B1

(12) United States Patent
Kinsley, Jr. et al.

(10) Patent No.: US 6,616,802 B1
(45) Date of Patent: Sep. 9, 2003

(54) PROCESS AND APPARATUS FOR MAKING A SHEET OF REFRACTORY FIBERS USING A FOAMED MEDIUM

(75) Inventors: Homan B. Kinsley, Jr., Powhatan, VA (US); Christopher B. Peart, Westhampton, MA (US)

(73) Assignee: FiberMark, Inc., Brattleboro, VT (US)

( * ) Notice: Subject to any disclaimer, the term of this patent is extended or adjusted under 35 U.S.C. 154(b) by 0 days.

(21) Appl. No.: 10/119,151

(22) Filed: Apr. 10, 2002

(51) Int. Cl.[7] ............................................... D21H 13/36
(52) U.S. Cl. ....................... 162/101; 162/145; 162/152; 162/157.1
(58) Field of Search ................. 162/101, 152, 162/145, 157.1, 157.2, 157.3, 157.5, 138

(56) References Cited

U.S. PATENT DOCUMENTS

| | | | | |
|---|---|---|---|---|
| 3,067,087 A | * | 12/1962 | Gorski et al. ............. | 162/157.1 |
| 4,200,488 A | * | 4/1980 | Brandon et al. ............ | 162/101 |
| 4,565,727 A | * | 1/1986 | Giglia et al. ................ | 162/146 |
| 4,609,433 A | * | 9/1986 | Crutchfield et al. ........ | 162/145 |
| 5,876,643 A | * | 3/1999 | Biggs et al. ................ | 162/101 |
| 5,989,390 A | * | 11/1999 | Lee ............................. | 162/141 |

* cited by examiner

Primary Examiner—Peter Chin
(74) Attorney, Agent, or Firm—Burns, Doane, Swecker & Mathis, L.L.P.

(57) ABSTRACT

The present invention relates to a method for forming a non-woven fibrous web comprised of refractory fibers which comprises forming a foam furnish by agitating the fibers in a foamed medium, and passing the foam furnish onto a screen and defoaming the furnish. The present invention employs a unique apparatus for effectively agitating the refractory fibers in the foamed medium, the agitating means being mounted for displacement within the foamed medium and including a convex leading surface facing in the direction of displacement. The leading surface includes upper and lower portions converging in the direction of displacement to form a generally convex leading surface and driving means for displacing the agitating means in the direction of displacement for dispersing and mutually separating the metal fibers within the foamed medium.

22 Claims, 3 Drawing Sheets

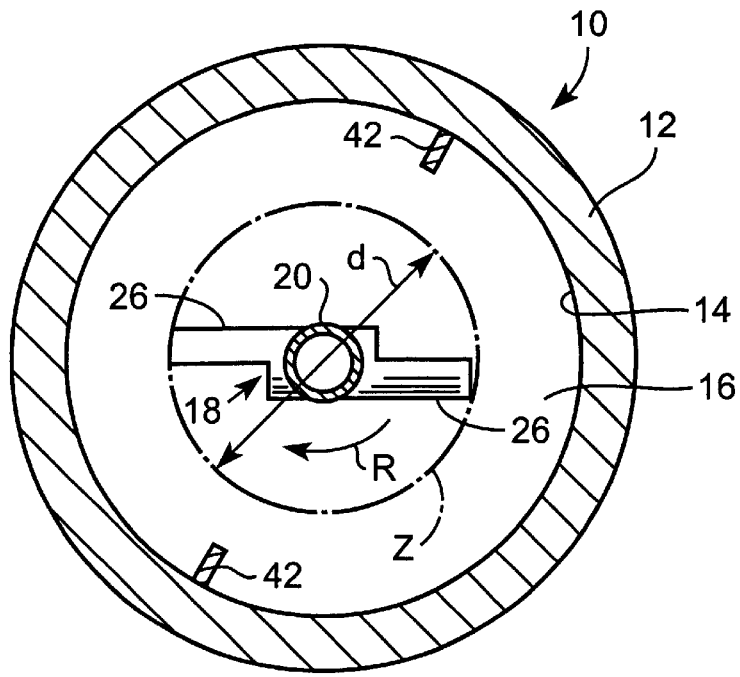
FIG. 2
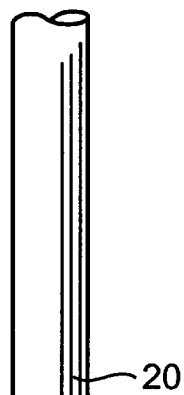
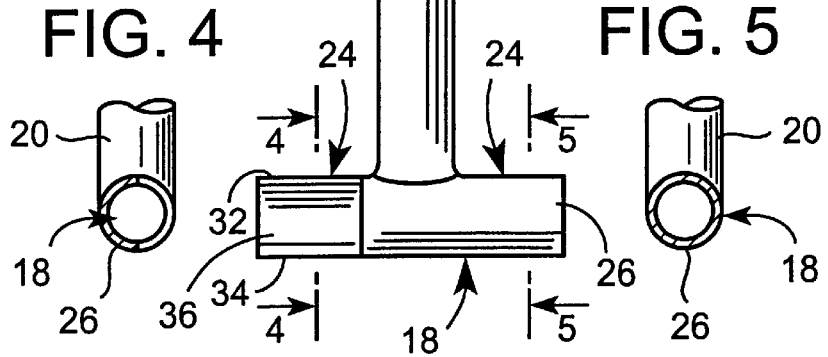
FIG. 4    FIG. 3    FIG. 5

PROCESS AND APPARATUS FOR MAKING A
SHEET OF REFRACTORY FIBERS USING A
FOAMED MEDIUM

BACKGROUND OF THE INVENTION

1. Field of the Invention

The present invention relates to a process for forming a sheet of refractory fibers using foam. The present invention also relates to a novel agitator for use in foam-forming a wet-laid, sheet of refractory fibers. More specifically, the present invention relates to an efficient foam process for making a uniform sheet of refractory fibers.

2. Description of the Related Art

The use of foam in a furnish for preparing wet-laid, non-woven fibrous webs is known. See, for example, U.S. Pat. No. 4,443,297, which discloses an apparatus and method for the manufacture of a non-woven fibrous web using foam. The method involves preparing a foam furnish with 55–75% volume air, recirculating a surfactant-water solution through a forming wire followed by foam storage in a silo to eliminate excess air, and then recycling foam from the bottom of the silo. See also, U.S. Pat. Nos. 4,349,414; 4,443,299; 4,498,956; and 4,543,156.

U.S. Pat. No. 4,488,932 relates to a method of manufacturing fibrous webs of enhanced bulk. The method involves hammermilling dry hydrophilic fibers to generate crimp, and then foam forming these fibers in 0.5 to 5 minutes to retain as much crimp as possible.

U.S. Pat. No. 4,686,006 relates to an apparatus and method for laying down a fibrous web from a foam-fiber furnish. A headbox is used which includes walls defining an elongate channel extending transversely of the direction of movement of the forming wire. Foam forming nozzles are positioned to introduce foam-fiber furnish into the channel for turbulence, inducing impact on an oppositely disposed wall defining the channel. The turbulently flowing foam-fiber furnish is then introduced to the headbox slice for discharge onto the forming wire with minimized orientation of the fibers.

Other patents which relate to the use of foam in making non-woven fibrous webs include U.S. Pat. Nos. 3,716,449; 3,938,782; 3,871,952; 3,837,999; 3,876,498; 3,846,232; 4,062,721; 3,746,613, 4,056,456; 5,720,851; 5,904,809; 6,238,518 and 6,258,203.

Sheets of refractory fibers have been made. However, the formed sheets lack uniformly and the processes are inefficient. Improved uniformity of dispersion and distribution of the refractory fibers in the web would be a great step forward in the art, as would increased ease and efficiency in forming the web. Techniques useful in the formation of more uniform non-woven webs made of refractory fibers would be of great benefit to the industry as such refractory fiber sheets have many potential uses.

Accordingly, it is an object of the present invention to provide a novel process for forming a non-woven fibrous web of refractory fibers using foam, which process provides a web in which the fibers are uniformly and evenly distributed.

Yet another object of the present invention is to provide a novel agitator, which agitator is useful in preparing the foam furnish for forming a non-woven fibrous web of such refractory fibers.

These and other objects and features of the invention will become apparent to one skilled in the art upon a review of the following description, the figures of the drawing and the claims.

SUMMARY OF THE INVENTION

In accordance with the foregoing objects, there is provided by the present invention an effective and efficient method for preparing a non-woven fibrous web of refractory fibers using a foam furnish, which foam furnish is prepared by using the novel agitating means of the present invention.

The apparatus used for agitating the refractory fibers in a foamed medium is unique. The apparatus comprises agitating means mounted for displacement within a foamed medium and includes a leading surface facing in a direction of displacement, the leading surface including upper and lower portions converging in the direction of displacement to form a generally convex leading surface. The trailing surface is concave. The abrupt transition between the two surface shapes leads to cavitation or bubble formation. The apparatus further comprises driving means for displacing the agitating means in the direction of displacement for dispersing and mutually separating the refractory fibers within the foamed medium.

More specifically, the apparatus for agitating the fibers in a foamed medium comprises a tank having a cylindrical surface forming an agitating chamber for containing a mixture of refractory fibers and foamed medium, which can include other functional additives. The agitating means is mounted for rotation about an upright axis coinciding with a longitudinal axis of the agitating chamber and including a plurality of legs projecting generally radially from the axis, each leg including a leading surface facing in a direction of rotation and terminating in upper and lower trailing ends, said leading surface including upper and lower portions which converge in the direction of rotation to form a generally convex leading surface. The apparatus frrther comprises driving means for rotating the agitating means to disperse and mutually separate the refractory fibers within the foamed medium, the agitating means forming a central agitation zone, the ratio of the diameter of the agitation zone to the diameter of the agitating chamber being from about 0.5 to about 0.95.

Thus, by the present invention there is provided a method for forming a non-woven, fibrous web composed of refractory fibers which comprises first forming a foam furnish by agitating the refractory fibers in a foamed medium, preferably aqueous, with the agitating means of the present invention. The resulting foam furnish is then passed onto a screen and defoamed using conventional techniques.

In another embodiment of the present invention there is provided a non-woven fibrous web comprised of refractory fibers prepared by the method of the present invention. The web exhibits excellent uniformity, i.e., very few fiber bundles, and substantially no fiber directionality. The web can also be comprised of very long fibers, as the method of the present invention can easily, and with efficiency, handle even long refractory fibers.

BRIEF DESCRIPTION OF THE DRAWING

FIG. 2. is a top view of an agitating apparatus of the present invention.

FIGS. 3–5 are side and end views of the agitator.

DETAILED DESCRIPTION OF THE PREFERRED EMBODIMENTS

Figure 1:
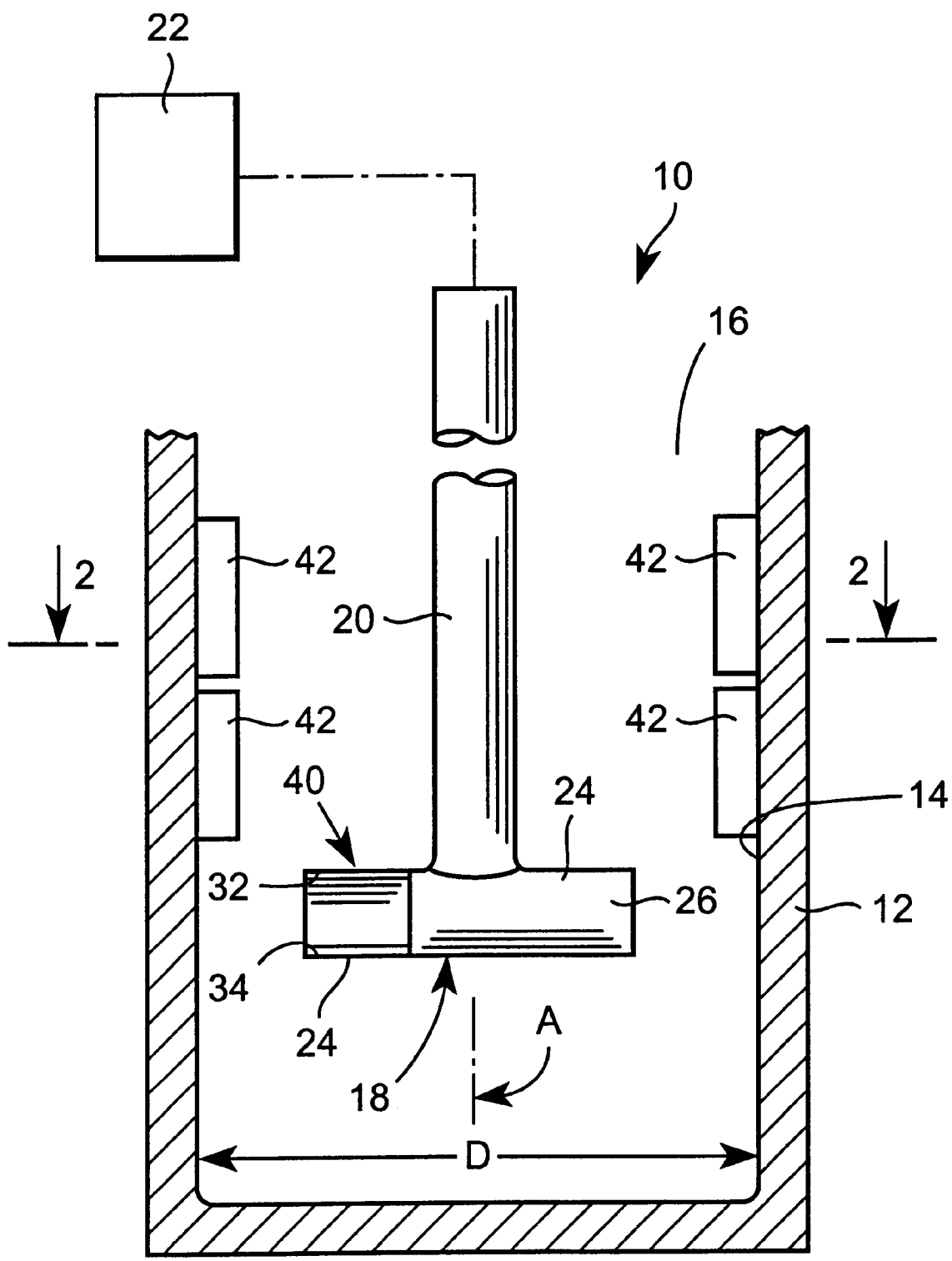
FIG. 1 is a side view of an agitating apparatus of the present invention.

The process of the present invention comprises the steps of first forming a foam furnish by agitating a fiber mixture comprised of up to 100% of refractory fibers, in a foamed medium with the agitation apparatus of the present invention, and then passing the foam furnish onto a screen, e.g., a wire or plastic fabricated screen, and defoaming the furnish. The agitating apparatus used in the process is depicted in the Figures of the Drawing, and can be described by reference thereto.

The agitating apparatus 10 shown in FIGS. 1–3 comprises a tank 12 having an internal cylindrical surface 14 forming a cylindrical agitating chamber 16 which receives the mixture of fibers, surfactant, and water. The mixture is agitated by an agitator 18 which causes the surfactant and water to form a foamed medium in which the refractory fibers are entrained. In particular, the agitator serves to keep the refractory fibers in a dispersed, mutually separated condition within the foamed medium, as will be hereinafter explained.

The agitator 18 is rotatable about a vertically upright axis A which coincides with the longitudinal axis of the cylindrical agitating chamber 16. The agitator is fixedly connected to the lower end of a vertical shaft 20 which is rotatably displaced by a motor 22 connected to an upper end of the shaft 20 in any suitable manner, such as by a pulley and belt connection represented by phantom lines.

Figure 12:
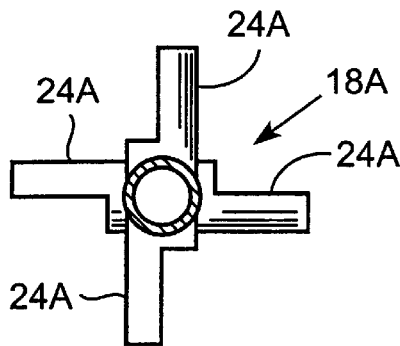
FIG. 12 is a top view of a four-legged agitator of the present invention.

The agitator 18 comprises a plurality of legs or blades 24 projecting radially from the axis A. The number of legs 24 may vary, there being two legs 24 shown in FIGS. 1 and 2. An alternative embodiment of the agitator 18A shown in FIG. 12 has four legs 24A. There could be other numbers of legs, e.g., three equally circumferentially spaced legs (not shown). The legs 24 shown in FIG. 1 are disposed in the same horizontal plane. Alternatively, the legs could be disposed in different planes. For example, if four legs 24A were used as shown in FIG. 12, they could be arranged in two pairs disposed in vertically spaced planes.

Figure 6:
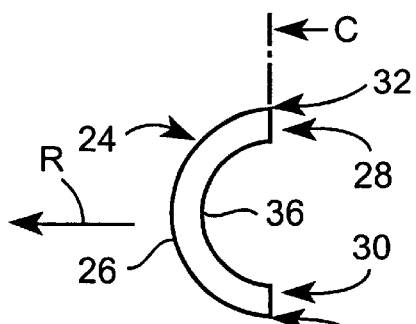
FIGS. 6–11 depict various acceptable shapes of the agitator legs.

Each leg includes a leading surface 26 facing in the direction of rotational displacement R (see FIGS. 2 and 6). That surface is of convex shape as the leg is viewed in cross section (see FIGS. 4 and 5). By convex is meant that the upper and lower portions of the leading surface converge in the direction of rotation R and meet at a relatively blunt junction. The bluntness of the junction precludes the collection of fibers. It is also preferred that the leading surface be smooth so that fibers can slip over its surface without forming flocs, spindles, or other forms of metal fiber aggregates.

Figure 11:
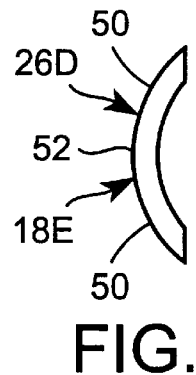

Various preferred convex configurations of the leading surface are depicted in FIGS. 6 and 11 and will be discussed hereinafter.

The leading surface 26 terminates in vertically spaced upper and lower trailing ends 28, 30 which form edges 32, 34, respectively. The trailing surface 36 of the leg 24, which surface faces away from the direction of rotation, is non-convex, e.g., concave in FIG. 6.

The legs 24 are formed by a hollow cylindrical bar 40. The axis A bisects the bar to form two bar sections disposed on opposite sides of the axis A. The portion of each bar section which faces away from the direction of rotation is truncated in that the trailing portion of the bar is cut along a plane C extending through the center of the bar (see FIG. 6). The truncation of a hollow cylinder represents a convenient way of forming the agitator, but, of course, other techniques could be used to form an agitator of the desired shape.

As the agitator rotates, it creates a circular agitation zone Z in the center of the agitation chamber or tank 16 (see FIG. 2). The ratio of the diameter d of that agitation zone to the diameter of the agitation chamber 16 (i.e., d/D) is preferably from about 0.5 to about 0.95, more preferably from about 0.65 to about 0.80; and most preferably from about 0.67 to about 0.75.

Rotation of the agitator 18 is initiated after the mixture of refractory fibers, water, and surfactant is placed within the agitation chamber. Other functional additives can be added, if desired. In response to that rotation, the surfactant and water produce a foamed medium in which the fibers are entrained. As the agitator 18 travels through the mixture, fibers impacted by the agitator are displaced upwardly or downwardly by the convex leading surface 26.

The convex leading surface of the agitator and the trailing concave following edge are important to the proper function of the apparatus. Fibers are impacted by the leading convex surface. This surface is made to be smooth so that the refractory fibers will slide along this surface without forming multi-fiber aggregates. As the refractory fibers leave this smooth convex surface they enter the abrupt transition to a concave surface. Intense cavitation occurs at this transition. Air pulled into this zone from the tank vortex or air added to the tank from some other source such as a pipe at the bottom, forms a foam which is stabilized by the presence of a surfactant which has been added to the water. This foam is characterized by small bubble size. Thus the refractory fibers entering this zone of bubble formation are immediately surrounded by foam. Since the foam possesses a high viscosity and low density, the refractory fibers surrounded by foam are prevented from tangling or flocculating as would be the case if they were in water. This apparatus is unique in its ability to disperse refractory fiber into a foam uniformly.

The entire mixture of fibers and foamed medium tends to swirl within the agitation chamber 16. It has been found preferably to provide a plurality of baffles 42 projecting radially inwardly from the surface 14 of the agitation chamber 16 in order to deflect the swirling mixture inwardly from the surface 14. This prevents the refractory fibers from accumulating at the surface 14 due to centrifugal force. The baffles are preferably plate-shaped and disposed diametrically apart. The number of baffles may vary. It has been found advantageous to provide four baffles when a two-legged agitator (FIG. 1) is used; to provide three or six baffles when a three legged agitator (not shown) is used; to provide four or eight baffles when a four-legged agitator (FIG. 12) is used.

In the case of three baffles, they would preferably be located at the same elevation and spaced apart circumferentially equidistantly .

In the case of four baffles, they would be arranged as two pieces of diametrically opposed baffles. The baffles can be equally circumferentially spaced, or vertically spaced.

The lower pair of baffles could be vertically aligned with respect to the upper pair of baffles, or they could be circumferentially offset therefrom.

Figure 7:
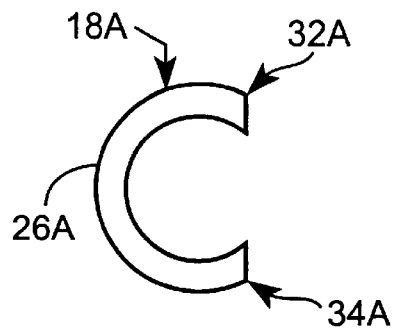

As pointed out earlier, the shape of the agitator legs can assume various forms. For example, as shown in FIG. 7 the agitator 18A could be formed of a segment of a cylinder, as in the case with the earlier described agitator 18. However, the truncation of the cylinder would occur rearwardly of the center of the bar to form the trailing edges 32A, 34A.

Figure 8:
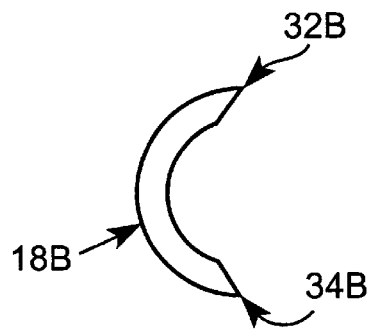

The agitator 18B depicted in FIG. 8 is similar to that of FIG. 6, but the upper and lower trailing ends of the agitator are beveled to form sharper trailing edges 32B, 34B.

Figure 9:
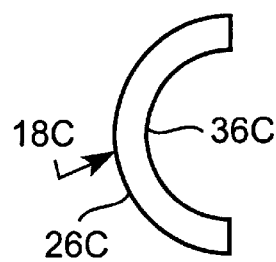

In FIG. 9, an agitator 18C is depicted in which the leading convex surface 26C and the trailing concave surface 36C are of oblong or elliptical shape in cross-section.

Figure 10:
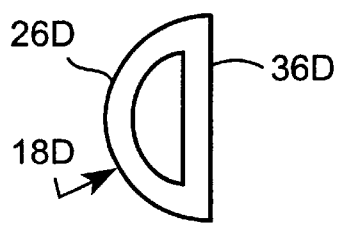

In FIG. 10, an agitator 18D is depicted in which the leading surface 26D is the same as in FIG. 6, but wherein the trailing surface 36D is flat.

An agitator 18E depicted in FIG. 11 has a convex leading surface 26D comprised of two flat portions 50 which converge in the direction of rotation, and which meet at a curved (blunt) junction 52.

The agitation is generally conducted such that the foam furnish created has an air content of at least 50% by volume, and more preferably an air content of at least 75% by volume.

The refractory fibers agitated can be any refractory fiber, having any length. The present invention is uniquely applicable to synthetic, e.g., organic, and metal fibers. One of the important advantages of the present invention is that excellent webs of not only difficult to handle refractory fibers, such as carbon fibers, can be easily made by the present method, but long refractory fibers can be easily handled and formed into an excellent web as well. The fiber mixture can comprise up to 100% refractory fibers, or the mixture can also comprise cellulosic, non-cellulosic or synthetic fibers. It is generally preferred that the mixture contain at least 50% by weight refractory fibers.

By refractory fibers is meant fibers prepared from a refractory material. Refractory materials can be earthy, ceramic materials of low thermal conductivity that are capable of withstanding extremely high temperatures (3000–4000° F.) without essential change. There are three broad groups of such materials, (i) acidic (e.g., silica, fireclay), (ii) basic (e.g., magnesite, dolomite); and (iii) amphoteric (e.g., alumina, carbon and silicon carbide). The outstanding property of these materials, and the fibrous webs prepared from their fibers, is the ability to act as insulators.

The present invention is particularly useful with and applicable to carbon fibers. Carbon fibers are generally prepared by the controlled pyrolysis of an organic precursor in fibrous form. Commercial products are based on rayon (a regenerated cellulose), pitch (petroleum and coal tar based), and PAN (polyacrylonitrile). The carbon fibers can also be graphite fibers, or activated carbon fibers.

More specifically, the term carbon fiber generally refers to materials that have been heat treated at temperatures of 1000–3000° C. and have markedly different properties and structure, i.e., they contain at least 92% carbon. In practice, the term carbon fiber sometimes refers to materials treated in the range of from 1000–2000° C., and the term graphite fiber refers to fibers processed at or in excess of 2500° C. Activated carbon and its fibers are obtained by "activating" a carbon fiber by heating at 800–900° C. with steam or carbon dioxide to result in a porous internal structure (honeycomb like). The internal surface of activated carbon in general averages about 10,000 square feet/gm, and the specific gravity is from 0.08 to 0.5.

Many inorganic fibers qualify as refractory fibers in accordance with the present invention. Such inorganic fibers include glass fibers, quartz and silica fibers, and ceramic fibers.

Glass is an amorphous material obtained by supercooling the molten glass, so that no ordered regions are formed. Glass fibers are prepared generally by melt spinning glass.

Silica fibers are smooth-surfaced, glasslike fibers, with a near round cross section. They are spun from silicon dioxide, which may be pure or contain a small amount of other materials. Silica fibers can be produced indirectly from glass filaments from which all constituents other than silica have been removed or through spinning a viscous filament that contains a high amount of silica. The organic materials are burned away, leaving a porous silica filament.

Quartz fibers are made from natural quartz crystals by softening quartz rods in an oxy-hydrogen flame and drawing the rods into filaments. Because high purity quartz crystals are rare, the cost of quartz fibers is considerably higher than that of fiberglass and high silica fibers.

Ceramic fibers are polycrystalline refractory materials composed of metal oxides, metal carbides, metal nitrides, and their mixtures. Starting materials include aluminum silicate, alumina, zirconia, boron nitride, silicon nitride, thoria, aluminum nitride, silicon nitride, potassium titanate, and polymeric materials such as polycarbosilane. Compared to glass fiber, ceramic fibers have higher thermal and chemical resistance, and higher oxidation resistance than carbon and graphite fibers. The densities of ceramic fibers are generally higher than those of glass, carbon, and graphite fibers.

While the length of the fibers used can be of any length, the present invention is most uniquely and advantageously applicable to long fibers, i.e., at least one-half inch. Refractory fibers of a length of one inch, one and one-half inch, two inches or more, even four inches in length, can also be readily incorporated into a non-woven fibrous web using the present agitator and foam process.

As noted above, the present invention is uniquely applicable to the formation of a non-woven fibrous web comprised of refractory fibers, which can be in mixture with other fibers, such as cellulosic, synthetic or metal fibers. Any synthetic, i.e., polymeric, fiber can be used. Examples include polyester, aramid, polyamide, and polyolefin fibers. The refractory fibers can also be used alone or in combination with metal fibers such as stainless steel, zinc, inorganic and/or nickel fibers. Mixtures of cellulosic (wood) and synthetic or other non-cellulosic fibers can also be used in combination with the refractory fibers.

The consistency of the foam furnish created, i.e., the percentage solids in the foam furnish, is generally in the range of from 0.2 to 2.0 wt %, and is preferably about 0.5 wt % or greater. A consistency of greater than 0.5% yields a product having a very high basis weight. A consistency of 1.0 wt % or more has heretofore been unusable, and therefore the present invention permits one to operate at much higher consistencies than are conventional, if it is so desired. An important advantage of being able to use a high consistency is that much less process solution or foam needs to be handled. Inclined wire markers can generally handle 0.5 inch fibers at a consistency of 0.05%, thereby requiring, however, 10× as much process solution or foam. The process of the present invention allows one to handle long refractory fibers at very high consistency and thereby enjoy the advantages and benefits thereof.

The agitator width to fiber length ratio is preferably at least about 1.25, more preferably at least 1.75, even more preferably at least 2.5 and most preferably at least 3.0. These higher ratios are preferred because they more consistently provide the best formed and most uniform non-woven web products independently of the other variables, such as the RPM of the agitator.

The foamed medium in which the refractory fibers are agitated can be formed during the agitation, or can be formed prior to the agitation of the fibers. When forming the foamed medium in situ, the order of addition of water, chemicals (binder), surfactant and fiber is not important. The surfactant, water and refractory fiber can be added into the mixing chamber in any order. Once the agitator is started, a successful foam dispersed refractory fiber will result. It is generally preferred, however, to not mix the fibers in the water without the presence of a surfactant. Since no foam would be generated without the surfactant, the refractory fibers would tend to tangle and agglomerate. It is possible, however, to successfully disperse the refractory fibers in a pre-existing foam.

The concentration of the surfactant depends on the surfactant. Generally, a concentration of about 0.1 wt % in the solution is preferred for a strong foam forming surfactant. If the surfactant is a weaker foam former, a stronger concentration may be preferred. Anionic, non-ionic and cationic surfactants can all be used, with appropriate adjustments in concentration where needed.

The time the foam furnish is mixed by the agitator of the present invention can vary greatly, as it is only important that a good dispersion of the fiber in the foam is achieved. Once a good dispersion has been achieved, longer mixing or agitation is generally neither helpful or harmful.

The temperature of the foam furnish can also vary greatly. The temperature need only be such so as to allow a foam to be generated.

Other conventional, functional additives can also be added to the foam furnish, as long as they do not interfere with the foaming nature of the surfactant. Polymeric binders can be added, and are preferred. For example, polyvinyl alcohol powder has provided good results, and is a preferred additive. Aluminum sulfate or paper maker's alum can also be added with a compatible surfactant.

Once the foam furnish has been made, the foam furnish is then passed onto a screen, such as that generally used in a typical Foudrinier machine. The foam furnish is then defoamed by using vacuum or suction boxes. Any of the conventional methods and apparatus for forming a fibrous web while using a foam can be employed with the foam funish of the present invention. The use of the agitation means of the present invention provides a foam furnish with a uniform dispersion of the fibers. As a result, the fibrous web obtained upon defoaming is a web exhibiting good individual fiber separation and a very uniform distribution. As well, there is no directionality of the fibers, i.e., the fiber direction is random, but with a uniform distribution of the fibers.

Such a uniform fibrous web is obtained even when one employs very long fibers, such as fibers having a length of one-half inch, one inch, two inches or longer, and even if cellulosic, synthetic or metal fibers are mixed with the refractory fibers. This is one of the greatest advantages of the present invention in that it permits one to make a fibrous web comprised of long refractory fibers, if desired in combination with other types of fibers, as easily and as quickly as one could make a paper web.

The uniform, non-woven webs prepared in accordance with the present invention, employing refractory fibers, can find many useful applications. Examples would include applications as diffusion layers in fuel cells, a membrane in a battery, a support in a double layer capacitor, as a medical electrode or in separation applications, both conductive and non-conductive. It is the uniformity of the non-woven web achieved through the practice of the present invention which would allow the webs comprised of the refractory fibers to be applicable in such environments. Without the practice of the present invention, successful application of the non-woven webs comprise the refractory fibers in the foregoing environments would not be believed possible.

Having thus described the preferred embodiments of the invention, it is clear that what may appear to be different embodiments could be provided without departing from the spirit and scope of the invention.

What is claimed is:

1. A method for forming a non-woven fibrous web comprised of refractory fibers, which comprises:
   (i) forming a foam furnish by agitating refractory fibers in a foamed medium with an apparatus comprising agitating means mounted for displacement within the foamed medium, said agitating means comprising a leading surface facing in a direction of displacement and a trailing surface, with the leading surface including upper and lower portions converging in the direction of displacement to form a generally convex leading surface, and the trailing surface being concave; and driving means for displacing the agitating means in the direction of displacement for dispersing and mutually separating the fibers within the foamed medium; and
   (ii) passing the foam furnish onto a screen and defoaming the furnish to thereby form the web.

2. The method of claim 1, wherein the refractory fibers agitated are comprised of carbon fibers.

3. The method of claim 1, wherein the refractory fibers agitated are further comprised of fibers at least one-half inch in length.

4. The method of claim 1, wherein the fibers agitated are further comprised of cellulosic fibers.

5. The method of claim 1, wherein the fibers agitated are further comprised of synthetic and/or metal fibers.

6. The method of claim 1, wherein the fibers agitated comprise inorganic fibers.

7. The method of claim 1, wherein the agitation in step (i) creates a foam furnish having an air content of at least 50% by volume.

8. The method of claim 1, wherein the air content of the foam furnish is at least 75% by volume.

9. The method of claim 1, wherein the weight percent solids of the foam furnish passed onto the wire screen is in the range of from 0.2 to 2.0.

10. The method of claim 1, wherein the weight percent solids of the foam furnish is greater than 0.5.

11. The method of claim 1, wherein the foamed medium is formed during the agitation of the fibers.

12. The method of claim 1, wherein the foamed medium is formed prior to agitation of the refractory fibers.

13. The method of claim 1, wherein the ratio of the width of a leading edge of the agitator to refractory fiber length is at least 1.25.

14. The method of claim 1, wherein the ratio of the width of a leading edge of the agitator to refractory fiber length is at least 1.75.

15. The method of claim 1, wherein the ratio of the width of a leading edge of the agitator to refractory fiber length is at least 3.0.

16. The method of claim 2, wherein the refractory fibers are comprised of activated carbon fibers.

17. The method of claim 2, wherein the refractory fibers are comprised of graphite fibers.

18. The method of claim 1, wherein the leading surface of the agitating means is continuously curved.

19. The method of claim 18, wherein the leading surface of the agitating means comprises a hollow cylinder.

20. A non-woven, fibrous web prepared by the method of claim 1, which web exhibits substantially no fiber directionality.

21. A non-woven, fibrous web prepared by the method of claim 16, which web exhibits substantially no fiber directionality.

22. A non-woven, fibrous web prepared by the method of claim 17, which web exhibits substantially no fiber directionality.

* * * * *